Aug. 26, 1952     A. E. LE VAN     2,608,207
SEALED FLOAT ROD

Filed Jan. 15, 1947     2 SHEETS—SHEET 1

INVENTOR.
AMBROSE E LEVAN
BY
Bruno Lechler

Aug. 26, 1952     A. E. LE VAN     2,608,207
SEALED FLOAT ROD

Filed Jan. 15, 1947     2 SHEETS—SHEET 2

INVENTOR.
AMBROSE E. LE VAN
BY
Bruno C. Lechler

Patented Aug. 26, 1952

2,608,207

UNITED STATES PATENT OFFICE 2,608,207

SEALED FLOAT ROD

Ambrose E. Le Van, Sellersville, Pa., assignor to American Machine and Metals, Inc., New York, N. Y., a corporation of Delaware Application January 15, 1947, Serial No. 722,135

5 Claims. (Cl. 137—448)

This invention relates to an improved method of flexibly supporting a rod in a diaphragm which closes an opening in a tank and apparatus adapted to carry out the method.

More specifically the invention relates to a method of supporting a rod in a diaphragm which forms part of a flexible unit according to which the rod is assembled in the flexible unit, the flexible unit is collapsed, inserted in a contracted portion of a passage in a housing, allowed to resume its shape, whereupon it anchors itself by the engagement of each of two flanges on the flexible unit with one of the ends of the contracted portion of the passage thereby sealing the opening and providing a flexible support for the rod.

The invention is an improvement on a method of supporting a rod in the diaphragm disclosed in my copending application Serial No. 714,114, filed December 4, 1946.

It has been found desirable to provide a more positive anchorage of the grommet by providing a flange at each end of the tubular portion. Furthermore, it has been found desirable to substitute a rib extending from one side of the tubular portion clear to the other side that merges into the tubular wall for the short rib shown in that application which does not extend into the wall of the tubular part.

The present invention, though not limited to use in pneumatic tanks of water storage systems is well adapted for such use. The invention contemplates first assembling the stem of a float which is adapted to be moved vertically by the rise and fall of water in a tank with a flexible diaphragm. This flexible diaphragm is preferably supported in a flexible cylindrical sleeve which is adapted to fit into a contracted portion of a circular passage. The flexible diaphragm carries at its ends outwardly extending flanges which normally prevent the diaphragm from moving in the contracted portion of the passage and these flanges also serve to seal off the inside of the tank from the outside. After the stem is assembled in the flexible unit this unit is collapsed so as to pass through the contracted portion of the passage. After insertion the unit is released springing back to its initial shape. Each flange engages one end of the contracted portion of the passage.

The construction shown is superior to constructions now in use because the rod extends through a boss or the like forming part of the flexible diaphragm to which it is anchored. This obviates the need of rigid metal washers clamped against opposite sides of the flexible diaphragm and limiting the flexible area and causing concentration of stresses at specific locations. The construction further supports the outer edge of the diaphragm without the necessity of clamping it in place. The combined tensile and flexural stresses around the edge of the flexible diaphragm are transmitted to the flexible wall and are dissipated. The location of the flanges at the end of the cylindrical piece prevents any local stresses incident to the engagement of the flange with the housing affecting the diaphragm.

In one form of the invention the diaphragm is reinforced by a flexible rib extending across its face. This rib reduces the distortion of the diaphragm by pressure and makes it easier for the rod to move in one plane than in another.

In the preferred form of the invention this rib is placed on a chord of the diaphragm located to one side of the center of the disc. When thus placed the collapsing of the flexible unit during assembly does not conflict with the greater stiffening secured in the direction of the rib.

One object of the invention is to provide a novel method for flexibly supporting a rod in a diaphragm which closes off a tank.

Another object of the invention is to provide a novel method of supporting a rod in a flexible diaphragm which forms part of a flexible unit which is adapted to be inserted in a contracted portion of a passage and to anchor itself therein.

Another object of the invention is to provide a flexible assemblage having a flexible diaphragm, a flexible rib extending across a chord of the diaphragm, the entire assemblage being adapted to be collapsed and passed into a contracted portion of a passage where it anchors itself upon expansion.

Figure 1:
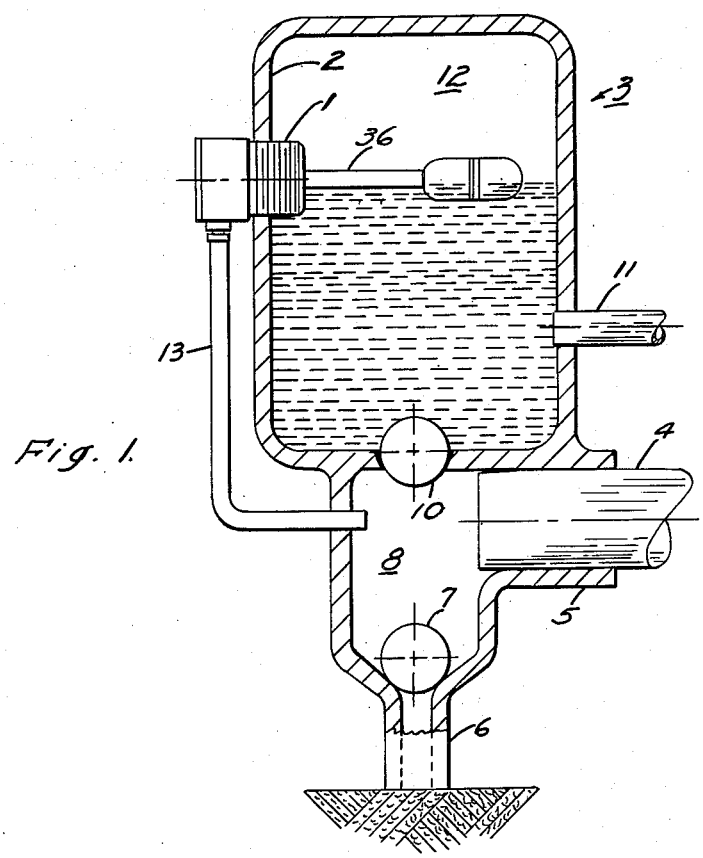
Fig. 1 is a vertical section of a pump equipped with an air chamber and the improved air volume regulator.
Figure 3:
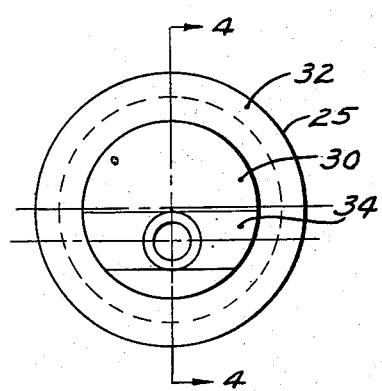
Fig. 3 is a side view of the grommet shown in Fig. 2.

I indicates generally the automatic air volume regulator. This is fastened into the wall 2 of the receiver 3 of a water pump. A reciprocating plunger 4 moving in the cylinder 5 is adapted to draw water up from a well or the like through a pipe 6. A check valve 7 prevents the return of water when the plunger moves in the opposite direction. When the plunger 4 returns, the water which has been drawn up through pipe 6 into space 8 is discharged into the receiver 3. A check valve 10 prevents the return of water so discharged into space 8. The water thus elevated by the pump is discharged through outlet line 11. As the level in receiver 3 rises above the outlet 11, air is trapped and compressed into space 12.

Figure 2:
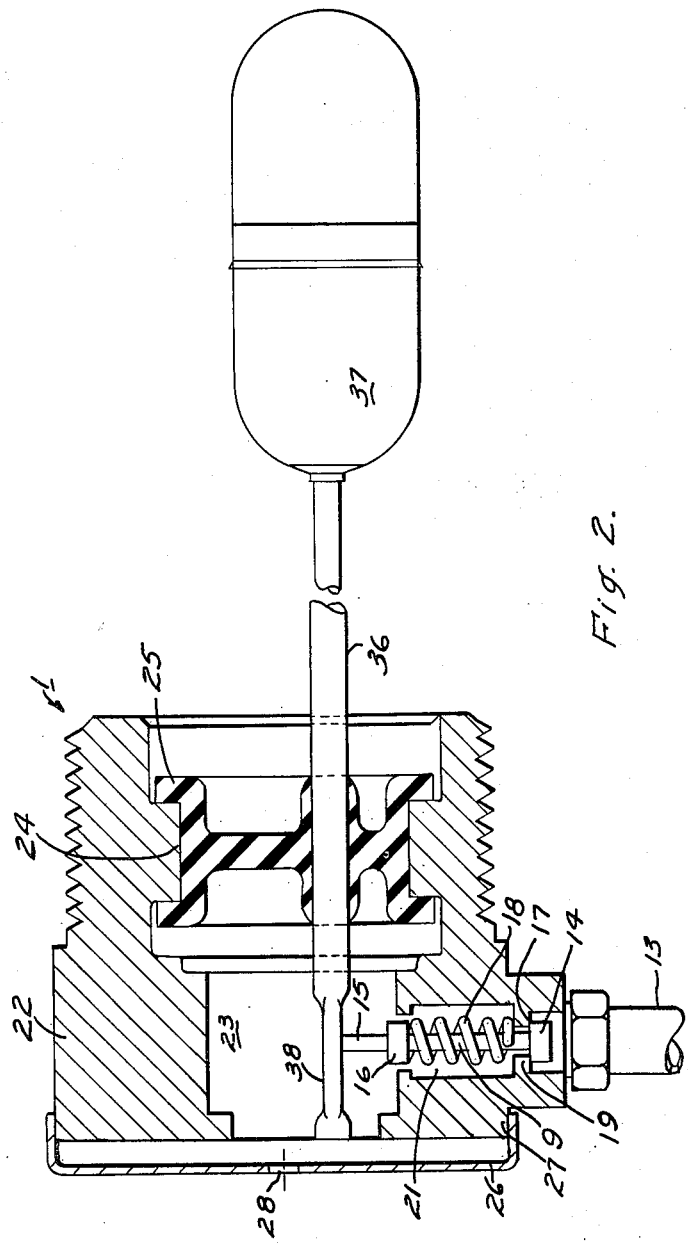
Fig. 2 is a vertical section, on an enlarged scale, of the air volume regulator shown in Fig. 1.

An air line 13 leads from the space 8 to a passage 21 in the body 22 of air volume regulator 1. This air line is normally closed by an air valve 9 in the passage having a head 14 and a stem 15. This stem has a collar 16. A spring 18 reacts against the flange 19 and the collar normally keeps this valve on its seat 17. Body 22 also has a central passage 23 extending from one end of the body to the other. Passage 21 leads into passage 23. Inside of this passage 23 is an annular flange 24. This passage is closed by a grommet generally indicated as 25 and held in place by flange 24. This grommet divides the passage 23 into two parts. The portion of the passage at the right in Fig. 2 is filled with the water under pressure contained in the receiver 3.

The left hand part of the passage is closed by a cap 26 which engages a flange 27 on the body 22. This cap has a hole 28 permitting air to pass freely into the left hand portion of the passage 23. The grommet 25 has a web 30 which is surrounded by a cylindrical flange 31. This cylindrical flange has two flanges 32 and 33 of larger diameter than the cylindrical portion 31. A rib 34 extends along a chord of the cylindrical flange 31 across the diaphragm. A hole 35 extends through this rib. A stem 36 is sealed into this opening, such as by vulcanizing. At one end of this stem 36 is the float 37. The other end of the stem may be flattened as at 38. This flattened portion engages the valve stem 15.

During the normal operation of the pump the parts of the air volume regulator remain in the positions shown. In this position the spring 18 has drawn the valve head 14 against its seat 17. Every time the plunger 4 in Fig. 1 moves to the right, suction is created in space 8. This suction is insufficient to overcome the pressure of spring 18 and therefore no air is drawn in through conduit 13. The suction in space 8 raises water through the passage 6 filling the void created by the receding plunger. Upon the return stroke of the plunger the pressure in line 13 rises tending to seat the valve head 14 more firmly. The pressure in space 8 lifts up the check valve 10 discharging water into the receiver 3. The liquid so pumped is drawn out through passage 11. Normally the float 37 rests upon the water in receiver 3 and the flat part 38 of float stem 36 does not depress the valve stem 15.

If some of the air in space 12 is lost, such as by absorption in the water which is being discharged through outlet 11, the float 37 will rise. The float stem 36 will now pivot about the rib 34. In so doing the end 38 of the float stem pushes the valve stem 15 downward opening the valve 14, and allowing air to be drawn into line 13. "When the pump is idle and a valve, not shown, in line 11 is opened the air compressed in space 12 expands and water is forced out through line 11. The level of the water in the tank drops and the pressure in space 12 decreases.

When the pump starts up again the water level again rises, the pressure in space 12 increases as the air is compressed and finally the water level will lift the float and tilt the rod 36 so that the outer end 38 of the rod can actuate the air valve in the manner described if air is to be added to space 12.

Figure 4:
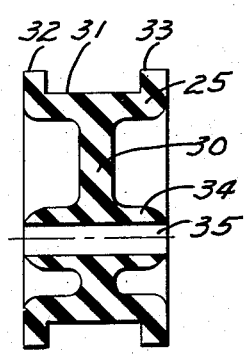
Fig. 4 is a vertical section along line 4—4 of Fig. 3.

As the float lifts the inner end of rod 36, reference to Fig. 4 will show that the hole 35 will be turned counter-clockwise in the plane of Fig. 4, and the diaphragm 30 will have to be distorted to do so.

One of the features of the invention is that by placing the rib 34 below the center of the cylinder 31, the rising level of the water will not only lift the float but the increasing pressure in space 12 will also dish the diaphragm 30 toward the left in Fig. 4. As the diaphragm 30 assumes this curved shape any line, such as rib 34, which is normal to the diaphragm will be tilted, unless it is at the center of the diaphragm. Where the rib is below the center of the diaphragm as shown here, the dishing of the diaphragm will tend to turn the rib 34 counterclockwise in the same direction of the float. Thus, the diaphragm 30 may be made more substantial because by the method here described the dishing of the diaphragm and the elevation of the float assist each other in tilting the rod 36.

I claim:

1. In an air volume control for a pumping system, in combination, a tank, a hole thru the wall of the tank, a tubular section of a resilient material fitting into the hole, a flexible diaphragm closing the tubular section, external flanges on the tubular section engaging respectively opposite faces of said wall, a rib integral with the diaphragm and extending from one side of the tubular section to the other side, an opening through the rib and the diaphragm, a rod extending thru said opening and sealed therein to prevent the passage of water along the rod.

2. In an air volume control for a pumping system, in combination, a tank, a hole thru the wall of the tank, a tubular section of resilient material fitting into the hole, a flexible diaphragm closing the tubular section, external annular flanges on the tubular section engaging respectively opposite faces of said wall, a rib integral with the diaphragm and extending from one side of the tubular section to the other side along a chordal line to one side of the axis of the tubular section, an opening thru the diaphragm and the rib, a rod extending thru said opening to prevent the passage of water along the rod.

3. A unitary flexible body having a tubular shell, a diaphragm extending across said tubular shell, a plurality of outwardly extending annular flanges on said tubular shell, a stiffening rib extending along one side of said diaphragm along a chordal line across the shell and a passage extending through said diaphragm and rib.

4. A unitary flexible body having a tubular shell, a diaphragm extending across said tubular shell, a plurality of outwardly extending annular flanges on said tubular shell, a stiffening rib extending along one face of said diaphragm across the shell along a line to one side of the diameter of the shell and a passage extending through said diaphragm and rib.

5. A housing adapted to be inserted in a horizontal opening in the wall of a tank which is closed at its upper end and into the bottom of which liquid is being forced, a horizontal passage extending through said housing, a contracted portion in said passage, a flexible cylinder adapted to be fitted into said contracted portion, a flexible diaphragm extending across said cylinder and integral therewith, flanges on either end of said flexible cylinder engaging opposite ends of the contracted portion of said passage, a horizontal stiffening rib attached to the lower half of said flexible diaphragm, a rod passing from the inside of said tank through said rib and diaphragm and supported thereby, a float carried by said rod so that the torque tending to twist the rib created by the rising level of liquid in the tank which lifts the float and tilts the rod is augmented by the increased bulging of the diaphragm under rising pressure in the tank and the angular displacement of a rib forming part of the diaphragm that is located below the center of the passage.

AMBROSE E. LE VAN.

REFERENCES CITED

The following references are of record in the file of this patent:

UNITED STATES PATENTS

| Number | Name | Date |
|---|---|---|
| 663,979 | O'Brien | Dec. 18, 1900 |
| 1,697,814 | Forbes | Jan. 1, 1929 |
| 1,800,578 | Webb | Apr. 14, 1931 |
| 1,818,973 | Giers | Aug. 18, 1931 |
| 1,885,457 | Lord | Nov. 1, 1932 |
| 1,970,628 | Schellens | Aug. 21, 1934 |
| 2,065,834 | Sevennes | Dec. 29, 1936 |
| 2,186,786 | Jensen | Jan. 9, 1940 |
| 2,228,811 | Beutin | Jan. 14, 1941 |
| 2,362,456 | Alden | Nov. 14, 1944 |
| 2,365,649 | Shaw | Dec. 19, 1944 |
| 2,368,132 | French | Jan. 30, 1945 |
| 2,443,145 | Payne | June 8, 1948 |
| 2,462,023 | Johanson | Feb. 15, 1949 |

FOREIGN PATENTS

| Number | Country | Date |
|---|---|---|
| 779,114 | France | of 1935 |